United States Patent [19]
Fetzer

[11] 3,749,955
[45] July 31, 1973

[54] ELECTROMAGNETIC BRAKE INCORPORATED IN SPINNING OR TWISTING SPINDLES

[75] Inventor: Gustav Fetzer, Gingen, Germany

[73] Assignee: Zinser-Textilmaschinen GmbH, Ebersbach, Germany

[22] Filed: Mar. 20, 1972

[21] Appl. No.: 236,076

[30] Foreign Application Priority Data
Mar. 19, 1971 Germany.................. P 21 13 275.2

[52] U.S. Cl. ................................... 310/93, 310/77
[51] Int. Cl. ......................................... H02k 49/00
[58] Field of Search ................. 310/93, 29, 92, 34, 310/75, 30, 76, 77, 106; 57/88; 242/156, 156.2

[56] References Cited
UNITED STATES PATENTS

| | | | |
|---|---|---|---|
| 3,579,973 | 5/1971 | Fetzer | 57/88 |
| 3,195,703 | 7/1965 | Comstock | 310/93 |
| 2,489,365 | 11/1949 | Broussouse | 310/77 |
| 2,461,759 | 2/1949 | Nelson | 310/77 UX |
| 3,167,673 | 1/1965 | Miquel | 310/93 |
| 3,180,075 | 4/1965 | Plasko | 310/93 |
| 3,176,173 | 3/1965 | Straub | 310/77 |

Primary Examiner—R. Skudy
Attorney—Edwin E. Greigg

[57] ABSTRACT

In a spinning or twisting spindle assembly there is incorporated an electromagnetically operated brake mechanism which is formed of the following basic components:

a main member including an iron ring fixedly secured to the stationary spindle support housing and a solenoid disposed in said ring; an intermediate annular member linearly movable parallel to the spindle axis and including two annular, spaced, coaxial flux-conducting zones and an annular brake shoe member disposed between the two annular flux-conducting zones; an armature rotating with the rotary spindle part as a unit and being frictionally engaged by the brake shoe of the intermediate member upon energization of the solenoid.

7 Claims, 4 Drawing Figures

3,749,955

ELECTROMAGNETIC BRAKE INCORPORATED IN SPINNING OR TWISTING SPINDLES

BACKGROUND OF THE INVENTION

This invention relates to a spinning or twisting spindle for use in spinning, twisting or draw twisting machines and is of the type which is provided with a brake mechanism for braking the rotary spindle part. The brake mechanism, in turn, is of the type that has at least one electromagnet containing at least one solenoid and an armature affixed to the rotary part of the spindle. Upon energization of the electromagnet, a friction face, which is prevented from rotating with the rotary spindle part, is pressed against the armature.

In a known spindle structure of the type outlined above, the brake mechanism includes an electromagnet which, as a whole, is axially movable and is supported coaxially with the spindle axis. Upon energization of the solenoid carried by this known electromagnet, the latter, in response to the magnetic forces generated between the electromagnet and its armature, is moved against gravity and is pressed against the armature to thus brake the same until it comes to a standstill. This type of brake mechanism has significant advantages with respect to other known brake assemblies, since it is structurally simple, it does not have the tendency to rust and has a uniform braking effect without the tendency of rattling. Further, this known brake mechanism exerts practically no force on the bearing of the rotary spindle part during the braking operation.

The aforeoutlined known brake mechanism has, however, several disadvantages. Thus, the electromagnet, when energized, strikes the armature too forcefully, its conductor for the current feed cannot be fixedly secured, it is complicated to replace the solenoid and it is difficult to secure the brake face to the electromagnet in a replaceable manner.

OBJECT AND SUMMARY OF THE INVENTION

It is an object of the invention to provide an electromagnetically operated improved brake mechanism incorporated in a spindle assembly from which the above-outlined disadvantages are eliminated.

Briefly stated, according to the invention, with a spinning or twisting spindle of the aforenoted type there is associated a brake mechanism which has an electromagnet comprising a main member that carries at least one solenoid and is held stationary relative to the housing of the spindle bearing. The main member has poles which extend normal to the direction of motion of a linearly displaceable intermediate member also forming part of the electromagnet. The intermediate member has at least two spaced, magnetizable flux-conducting zones and at least one braking face cooperating with the armature for braking the latter. The flux-conducting zones of the intermediate member have first poles which are disposed parallel to and adjacent opposite poles of the main member without clearance or spaced therefrom by a small air gap and second poles which are adjacent the armature and extend in the direction of motion of the intermediate member. In the de-energized condition of the solenoid, the intermediate member, either by its own weight or by spring means (or the combination thereof) is maintained out of engagement with the armature, whereas during the energized condition of the solenoid, it is pressed into contact with the magnet armature by virtue of the magnetic attraction forces generated between its said second poles and the armature.

The invention will be better understood, as well as further objects and advantages become more apparent, from the ensuing detailed specification of several exemplary embodiments taken in conjunction with the drawing.

DESCRIPTION OF THE FIRST EMBODIMENT

Figure 1:
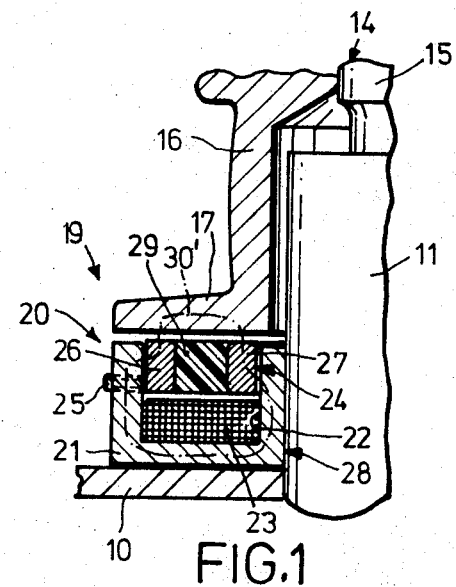
FIG. 1 is an axial, partially sectional fragmentary view of a spindle incorporating a first embodiment of the invention (components not essential for the understanding of the invention are omitted for the sake of clarity)

Turning now to FIG. 1, the spindle assembly shown therein in a fragmentary manner includes a spindle support housing 11 which is secured in a ring rail 10 and which accommodates bearing means for supporting the rotary spindle part 14. The latter includes a spindle shaft 15 and a whorl 16 fixedly attached thereto. The lower flange 17 of the whorl 16 serves as an armature of an electromagnetic brake assembly generally indicated at 19 and built according to the invention. All components of the brake assembly which serve for conducting the magnetic flux are rotationally symmetrical with respect to the spindle axis and are arranged coaxially therewith. The brake assembly 19, in addition to the armature 17, has a multipart electromagnet generally indicated at 20 which includes a ring 21 made of soft iron and fixedly attached to the spindle support housing 11, a solenoid 23 disposed fixedly in a rotationally symmetrical channel 22 of the ring 21 and an intermediate annular member 24 received in the channel 22 above the solenoid 23. The intermediate member 24 is guided linearly in the direction of the spindle axis by means of a plurality of radially outwardly extending members in the form of pins 25 (only one shown) which are affixed to the outer wall of the intermediate member 24 and which slide with a small clearance in axially parallel slots provided in the ring 21.

The cooperating sliding faces of the ring 21 and the intermediate member 24 are of cylindrical configuration. The ring 21 and the solenoid 23 constitute the main member 28 of the electromagnet 20 and are immobile with respect to the spindle support housing 11.

The intermediate member 24 is formed as an annulus of rectangular cross section which has two coaxial annular flux-conducting zones 26 and 27 made of soft iron and arranged in a radial distance from one another. The radial spacing between the zones 26 and 27 is ensured by an interposed connecting annular brake shoe member 29 which is made of a non-magnetizable, for example, synthetic material. The upper planar radial face of the brake shoe member 29 serves as a braking face which cooperates with the lower planar radial face of the armature 17 for braking the rotary spindle part 14.

OPERATION OF THE FIRST EMBODIMENT

In FIG. 1 the intermediate member 24 is shown in its lowest position which it assumes by virtue of its own weight when the solenoid 23 is in a de-energized condition. In this position the upper radial face of the intermediate member 24 is at a small distance below the lower radial face of the armature 17. This lowest position of the intermediate member 24 is determined by an engagement of the linear guiding pins 25 with the base of the guide slots provided in the iron ring 21. When the solenoid 23 is energized, a magnetic field in generated which is illustrated by a magnetic force line 30'. In this manner, at the vertical cylindrical inner wall faces of the iron ring 21 poles of opposite polarity are formed. Adjacent and parallel to these poles there extend first poles of the intermediate member 24. These first poles are formed on the convex, external cylinder faces of the flux-conducting zones 26, 27. Since the magnetic field is closed in an annular manner, at the planar annular radial faces of the flux-conducting zones 26, 27, second poles are formed which cooperate with poles that are formed on the adjacent radial face of the armature 17. The magnetic attracting forces generated in this manner between the armature 17 and the intermediate member 24 pull the latter vertically upwardly until the braking face of the intermediate member 24 is firmly pressed against the armature 17 and thus exerts a braking force thereon.

It is apparent that between the upper radial faces of the iron ring 21 and the armature 17 secondary magnetic circuits may be formed. Since, however, the distance between these radial faces and the armature 17 is relatively large and remains unchanged, such scattered fluxes are rendered ineffective at the latest when the intermediate member 24 arrives into engagement with the armature 17, since then the magnetic flux is closed substantially only through the intermediate member 24 and the armature 17. Immediately subsequent to the energization of the electromagnet, however, an appreciable part of the magnetic flux may form a circuit directly by extending from the ring 21 to the armature 17 and back into the ring 21. In this manner, the acceleration imparted on the intermediate member 24 is decreased, resulting in a dampened impact of the intermediate member 24 on the armature 17. As soon as the intermediate member 24 is in engagement with the armature 17, the aforediscussed scattered flux becomes small and practically does not affect the magnitude of the braking moment to be achieved.

DESCRIPTION OF THE SECOND EMBODIMENT

Figure 2:
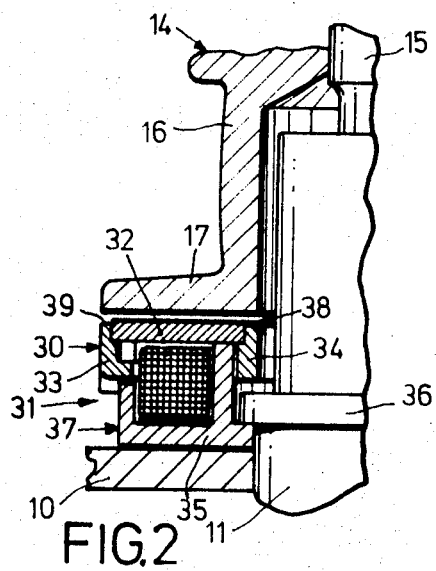
FIG. 2 is an axial, partially sectional fragmentary view of a spindle incorporating a second embodiment of the invention.

Turning now to FIG. 2, the annular intermediate member 30 of the electromagnet 31 forming part of the brake assembly has an approximately U-shaped cross section. Its mid portion is formed by a straddling annular disc constituting a brake shoe 32 made of a non-magnetizable material. The two flux-conducting zones 33, 34 of the intermediate member 30 are formed as cylindrical rings made of soft iron. The outer cylindrical ring 33 has, at several locations of its circumference, radially inwardly bent extension members in the form of tabs which extend into axially parallel slots of an iron ring 35 of the main member 37. The latter is held fixedly between the spindle rail 10 and a collar 36 of the spindle support housing 11. By virtue of the cooperation between the aforenoted tabs and axially parallel slots, the intermediate member 30 is guided during its displacement linearly and in an axial direction.

The outer iron ring 33 of the intermediate member 30 surrounds the iron ring 35 of the main member 37 of the electromagnet with a small clearance, whereas the inner ring 34 of the intermediate member 30 extends, with an air gap, adjacent that cylindrical face of the iron ring 35 that is closest to the spindle axis.

In the lowest position assumed by its own weight during the de-energized condition of the solenoid shown in FIG. 2, the intermediate member 30 engages with its brake shoe 32 the upper radial face of the iron ring 35 of the main member 37 forming part of the electromagnet 31. When the electromagnet is energized, the intermediate member 30 is pulled upwardly by virtue of the magnetic attracting forces generated between its second poles 38, 39 and the armature 17, in principle in the same manner as described in connection with the embodiment illustrated in FIG. 1. As a result, the brake shoe 32 is firmly pressed against the armature 17 for braking the latter.

Figure 3:
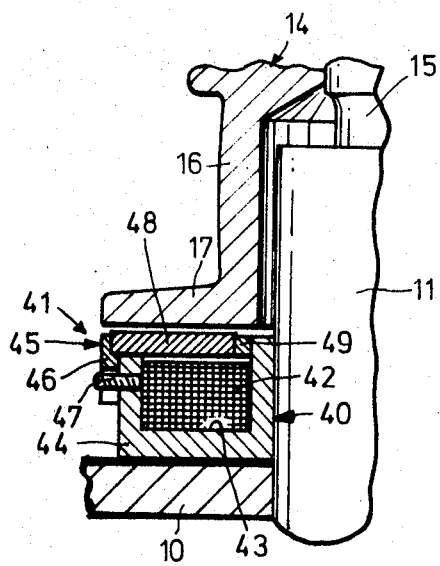
FIG. 3 is an axial, partially sectional fragmentary view of a spindle incorporating a third embodiment of the invention.

The whorl 16 of the rotary spindle part 14 is again, as it is in the embodiment according to FIG. 3, fixedly secured to the spindle shaft 15 and its lower flange forms the armature 17 of the brake assembly.

DESCRIPTION OF THE THIRD EMBODIMENT

In the embodiment according to FIG. 3, the main member 40 of the electromagnet 41 is designed similarly to that shown in FIG. 1, with the difference that the solenoid 42 takes up more space in the channel 43 of the iron ring 44 which forms part of the main component 40 and which is fixedly secured to the spindle support housing 11.

The annular intermediate member 45 of the electromagnet 41 is, here too, rotationally symmetrically arranged and has a rectangular cross section. One of its flux-conducting zones 46 is formed as a cylindrical ring which surrounds the outer cylindrical face of the iron ring 44 of the main member 40 and has on its circumference a plurality of axially parallel spaced slots. Into each slot there projects a radial extension member in the form of a pin 47 which is fixedly secured to the main member 40 and which serves for the linear guidance of the intermediate member 45 for its movement parallel to the spindle axis and relative to the ring 44. The brake shoe 48 of the intermediate member 45 is designed as a planar annular disc; it connects the outer iron ring 46 with an inner iron ring 49. The latter is adjacent and in sliding relationship with the cylindrical side wall of the channel 43 formed in the iron ring 44 of the main component 40 which has the smaller radius. The operation of the brake assembly according to FIG. 3 is, in principle, identical to those shown in FIGS. 1 and 2 and needs therefore no further elaboration.

DESCRIPTION OF THE FOURTH EMBODIMENT

Figure 4:
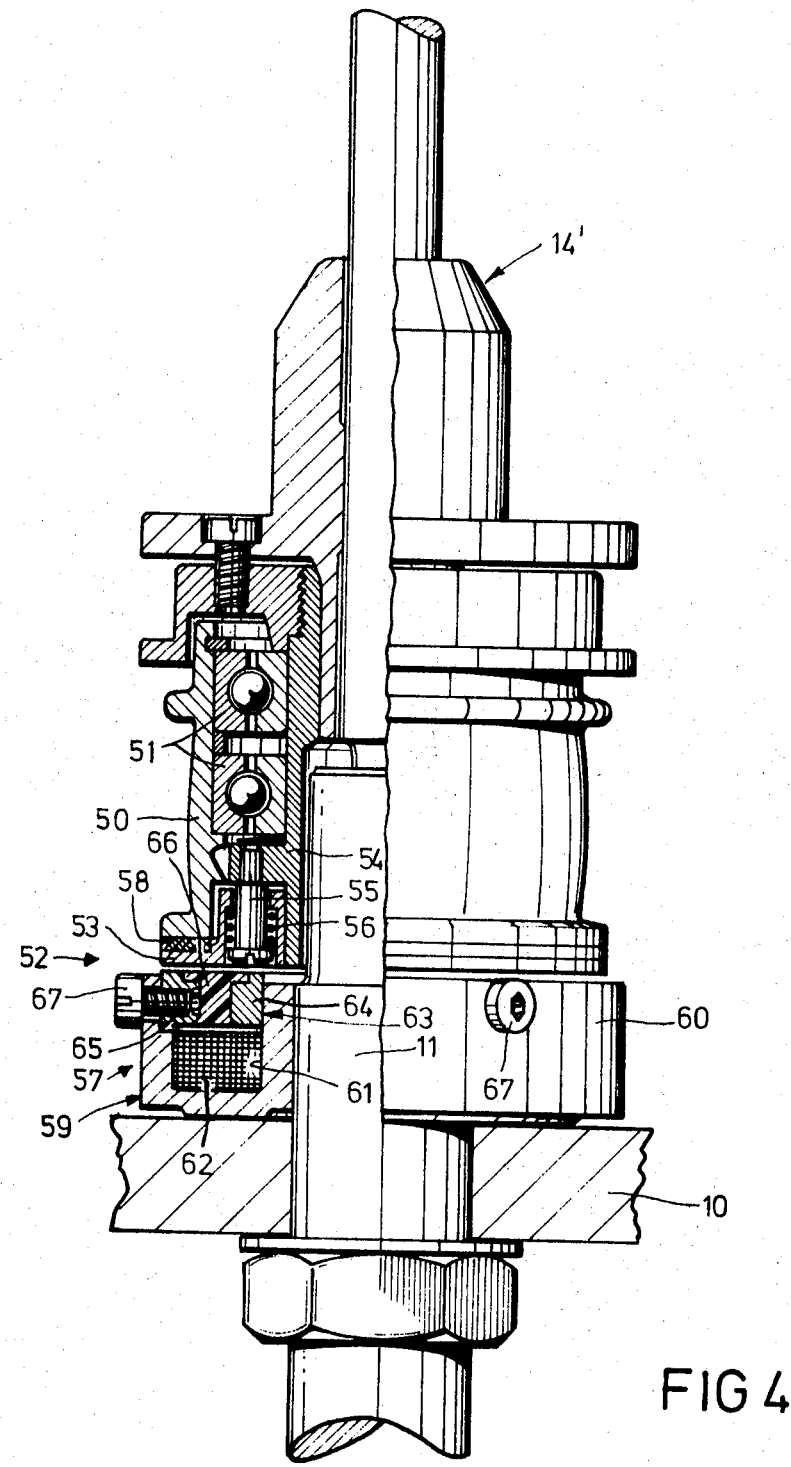
FIG. 4 is an axial, partially sectional fragmentary view of a spindle incorporating a fourth embodiment of the invention.

In the embodiment according to FIG. 4 there is illustrated a spindle, the whorl 50 of which is rotatably supported in a known manner on the rotatable spindle part 14' by means of roller bearings 51. The purpose of this arrangement is to make possible an uncoupling of the whorl 50 from the rotary spindle part 14' during braking so that the whorl 50 may be continuously rotated by the driving belt (not shown) trained thereabout without thus hindering the braking of the rotary spindle part 14'. For this purpose there is provided a clutch member 53 which also serves as the armature of the electromagnetic brake assembly 52 and which is axially guided on a carrier sleeve 54 of the rotary spindle part 14'. The clutch member 53 is spring biased by means of compression springs 56 one inserted on each of a plurality of pins 55 and is thus continuously urged in a direction away from the electromagnet 57. In this manner a clutch face 58 mounted on the clutch member 53 is, in the normal operating position, pressed into engagement with a planar lower radial face of the whorl 50 and thus a firm connection is effected between the whorl 50 and the rotary spindle part 14'.

The disconnection of the clutch member 53 from the rotary spindle part 14' is effected by virtue of the operation of the electromagnet 57. Simultaneously, the clutch member 53 which at all times rotates with the rotary spindle part 14' as a unit, is braked, thus also effecting the rotary spindle part 14'.

The embodiment illustrated in FIG. 4 is thus a combined, electromagnetically operated brake-and-clutch assembly, the structure of which will now be described.

The electromagnet 57 has a main member 59 which is fixedly secured to the spindle support housing 11 and which is formed of an iron ring 60 of U-shaped cross section and a solenoid 62 disposed in the annular channel 61 of the ring 60. In the channel 61 there is disposed, in a manner identical in principle to the embodiment according to FIG. 1, an intermediate member 63 of the electromagnet 57. The intermediate member 63 is axially movably supported and is linearly guided by means of radially outwardly extending extension members in the form of screws 67 carried on the periphery of the intermediate member 63 and extending into axially parallel spaced slots provided in the outer circumferential wall of the iron ring 60.

Inner and outer coaxial iron rings 64 and 65 of the intermediate member 63 form flux conducting zones and are radially spaced and connected with one another by means of a ring 66 made of an insulating material. The ring 66 is embedded between the two rings 64, 65 and has an upper radial face which serves as a frictional brake face.

In FIG. 4 the intermediate member 63 is shown in its uppermost position which is determined by the engagement of the screws 67 with the upper edge of the slots provided in the iron ring 60. FIG. 4 depicts a momentary position of the brake assembly 52 which it assumes shortly after the energization of the solenoid 62. In this position the intermediate member 63 has been lifted off its lower position and moved into its shown upper position by virtue of the magnetic attraction forces generated between the intermediate member 63 and the clutch member 53 which also serves as the magnet armature. As soon as the intermediate member 63 has reached the last-named upper position, the magnetic attracting force then prevailing between the intermediate member 63 and the armature or clutch member 53 causes the latter to move downwardly until it engages the brake face of the intermediate member 63. It is seen that the downward movement of the clutch member 53 means the uncoupling of the whorl 50 from the rotary spindle part 14'. Since — as it was mentioned earlier — the clutch member 53 always remains rotationally coupled to the rotary spindle part 14', a braking engagement between the lower radial face of the clutch member 53 and the upper radial face of the non-rotatable intermediate member 63 also effects a braking of the rotary spindle part 14'.

The axial displaceability of the intermediate member 63 is advantageous in that at the moment of energization of the electromagnet, the magnetic attracting forces generated between the intermediate member 63 and the clutch member 53 have to be only as large as is necessary to lift the intermediate member 63 into its shown uppermost position against its own weight. Consequently, the initial air gap between the intermediate member 63 and the clutch member 53 may be relatively large. When the intermediate member 63 has reached its uppermost position, the aforenamed air gap has already decreased substantially and thus the magnetic attracting forces between the intermediate member 63 and the clutch member 53 have increased to such an extent that they are now capable to pull the clutch member 53 against the force of the biasing springs 56 downwardly to press it against the intermediate member 63.

By providing the possibility to design a relatively large air gap between the intermediate member 63 and the clutch member 53, the operational safety of the brake assembly is increased and the cost of manufacturing lowered. This advantage is, of course, also present in the embodiments according to FIGS. 1-3 because there, too, due to the small weight of the intermediate member, large air gaps may be provided between the intermediate member and the armature, because immediately subsequent to the energization of the electromagnet only a lifting force has to be exerted on the relatively light intermediate member to overcome its weight.

SUMMARY OF THE ADVANTAGES AND EXAMPLES OF FURTHER MODIFICATIONS

As seen, the main member 28; 37; 40; 59 of the electromagnet 20; 31; 41; 57 is always stationary and thus no drawbacks are introduced if it is designed as a relatively heavy component.

During the braking operation it is only the intermediate member 24; 30; 45; 63 which is exposed to wear. If a new brake face is required, the entire inexpensive intermediate member is simply replaced.

The structure according to the invention further permits an uncomplicated replacement of the solenoid. The latter becomes accessible after lifting off the intermediate member.

Since the solenoid and its support always remain stationary, the electric conductor leading to the solenoid may be secured in a fixed, immobilized manner and is thus well protected from damage.

During operation of the brake mechanism, the solenoid is not exposed to any impact as it is the case in prior art devices where the solenoid and its support, too, move against the armature. Also, the impact with which the intermediate member strikes the armature upon energization of the solenoid is relatively small due to the relatively small mass of the intermediate member.

The load on the bearings of the rotary spindle part due to braking is even smaller than in spindle brakes of known structure.

It is essential for the operation of the intermediate member that its direction of motion is approximately normal to the magnetic field generated between the intermediate member and the main member, because in this manner it is ensured that despite the presence of this magnetic field the intermediate member is readily displaceable in an axial direction. In contradistinction, the magnetic field generated between the intermediate member and the armature 17 is substantially parallel to the direction of motion of the intermediate member. Consequently, between these two components significant magnetic attracting forces appear which pull the intermediate member to the armature.

In all four exemplary embodiments described hereinabove, the structure contained but a single electromagnet. It is to be understood that instead of a sole electromagnet two or more electromagnets of identical or similar structure may be used. In such a case each electromagnet is built according to the invention. The use of a plurality of electromagnets is expedient, for example, when the brake faces of the brake mechanism extend parallel to the spindle axis, so that the intermediate member moves radially with respect to the spindle axis. In such an arrangement it is expedient to use two or more electromagnets disposed equally spaced in a circular array.

That which is claimed is:

1. In an electromagnetic brake assembly incorporated in spinning or twisting spindles having a rotary spindle part to be braked and a spindle housing for supporting said rotary spindle part, said brake assembly having an electromagnet including at least one solenoid, an armature rotating with said rotary spindle part as a unit and a brake shoe adapted to be pressed against said armature upon energization of said solenoid to brake said rotary spindle part, the improvement in said electromagnet comprising
   A. a main member having at least one solenoid and being held immobile with respect to said spindle housing, said main member having poles thereon,
   B. an intermediate member linearly movable with respect to said main member in a direction parallel to the course of said poles thereon, said intermediate member having
      1. at least two spaced rings disposed coaxially with respect to one another and the spindle axis, said spaced rings constituting two flux-conducting zones which have first poles extending parallel to and adjacent opposite poles on said main member and second poles disposed adjacent said armature in the direction of motion of said intermediate member,
      2. a non-magnetizable ring extending between said two spaced rings for magnetically separating and mechanically connecting the same, said non-magnetizable ring carrying at least one brake face cooperating with said armature,
   C. means maintaining said intermediate member out of contact with said armature during the de-energized condition of said solenoid, said means being overcome by the force of the magnetic field generated between said second poles of said intermediate member and said armature during the energized condition of said solenoid for pressing said intermediate member with said brake face against said armature, and
   D. means for linearly guiding said intermediate member parallel to the spindle axis.

2. In an electromagnetic brake assembly incorporated in spinning or twisting spindles having a rotary spindle part to be braked and a spindle housing for supporting said rotary spindle part, said brake assembly having an electromagnet including at least one solenoid, an armature rotating with said rotary spindle part as a unit and a brake shoe adapted to be pressed against said armature upon energization of said solenoid to brake said rotary spindle part, the improvement in said electromagnet comprising
   A. a main member having at least one solenoid and being held immobile with respect to said spindle housing, said main member having poles thereon,
   B. an intermediate member linearly movable with respect to said main member in a direction parallel to the course of said poles thereon, said intermediate member having
      1. at least two flux-conducting zones spaced from one another, said flux-conducting zones having first poles formed as cylindrical surfaces which extend parallel to and adjacent opposite poles on said main member and second poles formed as planar annular surfaces extending normal to said cylindrical surfaces and disposed adjacent said armature in the direction of motion of said intermediate member,
      2. at least one brake face cooperating with said armature, and
   C. means maintaining said intermediate member out of contact with said armature during the de-energized condition of said solenoid, said means being overcome by the force of the magnetic field generated between said second poles of said intermediate member and said armature during the energized condition of said solenoid for pressing said intermediate member with said brake face against said armature.

3. In an electromagnetic brake assembly incorporated in spinning or twisting spindles having a rotary spindle part to be braked and a spindle housing for supporting said rotary spindle part, said brake assembly having an electromagnet including at least one solenoid, an armature rotating with said rotary spindle part as a unit and a brake shoe adapted to be pressed against said armature upon energization of said solenoid to brake said rotary spindle part, the improvement in said electromagnet comprising
   A. a main member having poles thereon, two spaced external faces and at least one solenoid, said main member being held immobile with respect to said spindle housing,
   B. an intermediate member linearly movable with respect to said main member in a direction parallel to the course of said poles thereon, said intermediate member having
      1. at least two flux-conducting zones spaced from one another and each extending adjacent a different one of said external faces, said flux-conducting zones having first poles extending parallel to and adjacent opposite poles on said main member and second poles disposed adjacent said armature in the direction of motion of said intermediate member,
      2. at least one brake face cooperating with said armature, and
   C. means maintaining said intermediate member out of contact with said armature during the de-energized condition of said solenoid, said means being overcome by the force of the magnetic field generated between said second poles of said intermediate member and said armature during the energized condition of said solenoid for pressing said intermediate member with said brake face against said armature.

4. In an electromagnetic brake assembly incorporated in spinning or twisting spindles having a rotary spindle part to be braked and a spindle housing for supporting said rotary spindle part, said brake assembly having an electromagnet including at least one solenoid, an armature rotating with said rotary spindle part as a unit and a brake shoe adapted to be pressed against said armature upon energization of said solenoid to brake said rotary spindle part, the improvement in said electromagnet comprising
   A. a main member having poles thereon, at least one solenoid, an external lateral wall face, a frontal face with a recess provided therein and an inner lateral wall face bounding said recess, said main member being held immobile with respect to said spindle housing,
   B. an intermediate member linearly movable with respect to said main member in a direction parallel to the course of said poles thereon, said intermediate member having
      1. at least two flux-conducting zones spaced from one another, with one flux-conducting zone extending adjacent said external lateral wall face and the other flux-conducting zone extending adjacent said inner lateral wall face, said flux-conducting zones having first poles extending parallel to and adjacent opposite poles on said main member and second poles disposed adjacent said armature in the direction of motion of said intermediate member,
      2. at least one brake face cooperating with said armature, and
   C. means maintaining said intermediate member out of contact with said armature during the de-energized condition of said solenoid, said means being overcome by the force of the magnetic field generated between said second poles of said intermediate member and said armature during the energized condition of said solenoid for pressing said intermediate member with said brake face against said armature.

5. In an electromagnetic brake assembly incorporated in spinning or twisting spindles having a rotary spindle part to be braked and a spindle housing for supporting said rotary spindle part, said brake assembly having an electromagnet including at least one solenoid, an armature rotating with said rotary spindle part as a unit and a brake shoe adapted to be pressed against said armature upon energization of said solenoid to brake said rotary spindle part, the improvement in said electromagnet comprising
   A. means for axially movably securing said armature to said rotary spindle part,
   B. spring means for urging said axially movable armature away from said electromagnet into a position of rest,
   C. a main member having at least one solenoid and being held immobile with respect to said spindle housing, said main member having poles thereon,
   D. an intermediate member linearly movable with respect to said main member in a direction parallel to the course of said poles thereon, said intermediate member having
      1. at least two flux-conducting zones spaced from one another, said flux-conducting zones having first poles extending parallel to and adjacent opposite poles on said main member and second poles disposed adjacent said armature in the direction of motion of said intermediate member,
      2. at least one brake face cooperating with said armature,
   E. abutment means limiting the displacement of said intermediate member towards said armature in response to the energization of said solenoid, said abutment means arresting said intermediate member in its displacement towards said armature in a position spaced from the position of rest of said armature,
   F. means maintaining said intermediate member out of contact with said armature during the de-energized condition of said solenoid, said means being overcome by the force of the magnetic field generated between said second poles of said intermediate member and said armature during the energized condition of said solenoid for pressing said intermediate member against said abutment means, and
   G. means for axially moving said armature to engage said intermediate member in its position arrested by said abutment means.

6. An improvement as defined in claim 5, wherein said spindle includes a whorl rotatably supported with respect to said rotary spindle part, said armature being formed as a clutch member rotationally coupling said whorl to said rotary spindle part in said position of rest, said clutch member uncoupling said whorl and said rotary spindle part upon axial movement of said clutch member towards said intermediate member against the force of said spring means in response to the energization of said solenoid.

7. In an electromagnetic brake assembly incorporated in spinning or twisting spindles having a rotary spindle part to be braked and a spindle housing for supporting said rotary spindle part, said brake assembly having an electromagnet including at least one solenoid, an armature rotating with said rotary spindle part as a unit and a brake shoe adapted to be pressed against said armature upon energization of said solenoid to brake said rotary spindle part, the improvement in said electromagnet comprising
   A. a main member having at least one solenoid and being held immobile with respect to said spindle housing, said main member having poles thereon,
   B. an intermediate member linearly movable with respect to said main member in a direction parallel to the course of said poles thereon, said intermediate member having
      1. at least two flux-conducting zones spaced from one another, said flux-conducting zones having first poles extending parallel to and adjacent opposite poles on said main member and second poles disposed adjacent said armature in the direction of motion of said intermediate member,
      2. at least one brake face cooperating with said armature, C. means maintaining said intermediate member out of contact with said armature during the de-energized condition of said solenoid, said means being overcome by the force of the magnetic field generated between said second poles of said intermediate member and said armature during the energized condition of said solenoid for pressing said intermediate member with said brake face against said armature, and D. cooperating means in the form of an extension member mounted on said intermediate member and a slot formed in said main member, said extension member being insertable within said slot to linearly guide said intermediate member on and with respect to said main member.

* * * * *